United States Patent [19]
Brown

[11] Patent Number: 5,894,972
[45] Date of Patent: Apr. 20, 1999

[54] HANDS-FREE CARRIER FOR LOADED BAGS

[76] Inventor: Leon Brown, 20602 Plymouth Rd., Apt. 210, Detroit, Mich. 48228

[21] Appl. No.: 09/056,497

[22] Filed: Apr. 7, 1998

Related U.S. Application Data

[60] Provisional application No. 60/042,779, Apr. 7, 1997.

[51] Int. Cl.⁶ .................. A45F 5/10; B65G 7/12
[52] U.S. Cl. ............ 224/267; 224/268; 294/25; 294/170
[58] Field of Search ............ 294/25, 137, 158, 294/159, 170; 224/219–221, 255, 267, 268; D9/434

[56] References Cited

U.S. PATENT DOCUMENTS

| | | | |
|---|---|---|---|
| 530,215 | 12/1894 | Weiss | 224/220 |
| 645,317 | 3/1900 | Flanders . | |
| 759,056 | 3/1904 | Woodman . | |
| 1,279,073 | 9/1918 | Baake | 224/268 |
| 1,327,293 | 1/1920 | Rolfes | 294/170 |
| 1,463,977 | 8/1923 | Smith | 224/268 |
| 1,557,271 | 10/1925 | Rittenhouse, Jr. | 224/268 |
| 2,278,610 | 4/1942 | Brownson et al. | 294/25 |
| 2,684,797 | 7/1954 | Schulte | 294/170 |
| 2,782,915 | 2/1957 | Fahringer | 294/170 |
| 3,251,622 | 5/1966 | Miller | 294/33 |
| 3,262,727 | 7/1966 | Blackaby | 294/170 |
| 3,913,172 | 10/1975 | Richards et al. | 16/114 B |
| 4,936,619 | 6/1990 | Salazar | 294/171 |
| 4,946,065 | 8/1990 | Goulter et al. | 220/404 |
| 4,991,894 | 2/1991 | Rutens | 294/137 |
| 5,026,105 | 6/1991 | Feldman | 294/170 |
| 5,029,926 | 7/1991 | Dieterich, Jr. | 294/171 |
| 5,150,938 | 9/1992 | Gans | 294/156 |
| 5,368,393 | 11/1994 | Normann | 383/13 |
| 5,458,301 | 10/1995 | Cournoyer | 248/95 |

FOREIGN PATENT DOCUMENTS

| | | | |
|---|---|---|---|
| 552633 | 5/1923 | France | 294/171 |
| 962780 | 6/1950 | France | 294/25 |
| 2541099 | 8/1984 | France | 294/170 |
| 2132079 | 7/1984 | United Kingdom | 294/171 |
| 2153212 | 8/1985 | United Kingdom | 294/170 |

*Primary Examiner*—Dean Kramer
*Attorney, Agent, or Firm*—Gifford, Krass, Groh, Sprinkle, Anderson & Citkowski, P.C.

[57] ABSTRACT

A hands-free carrier for supporting a plurality of handled shopping bags. The carrier includes a U-shaped carrier body having a base and a pair of opposed legs joined thereto. Each of the legs terminates in a free end. Formed on each of the free ends is a hook. Each hook curves in a direction toward the base of the carrier body. The carrier body is adapted to be supported by a user with the base passing over the forearm of the user, and the hooks disposed substantially below the forearm. Each of the hooks may be inserted through the handle of a loaded shopping bag, thus allowing the user to carry the shopping bags while retaining free use of the hand.

2 Claims, 1 Drawing Sheet

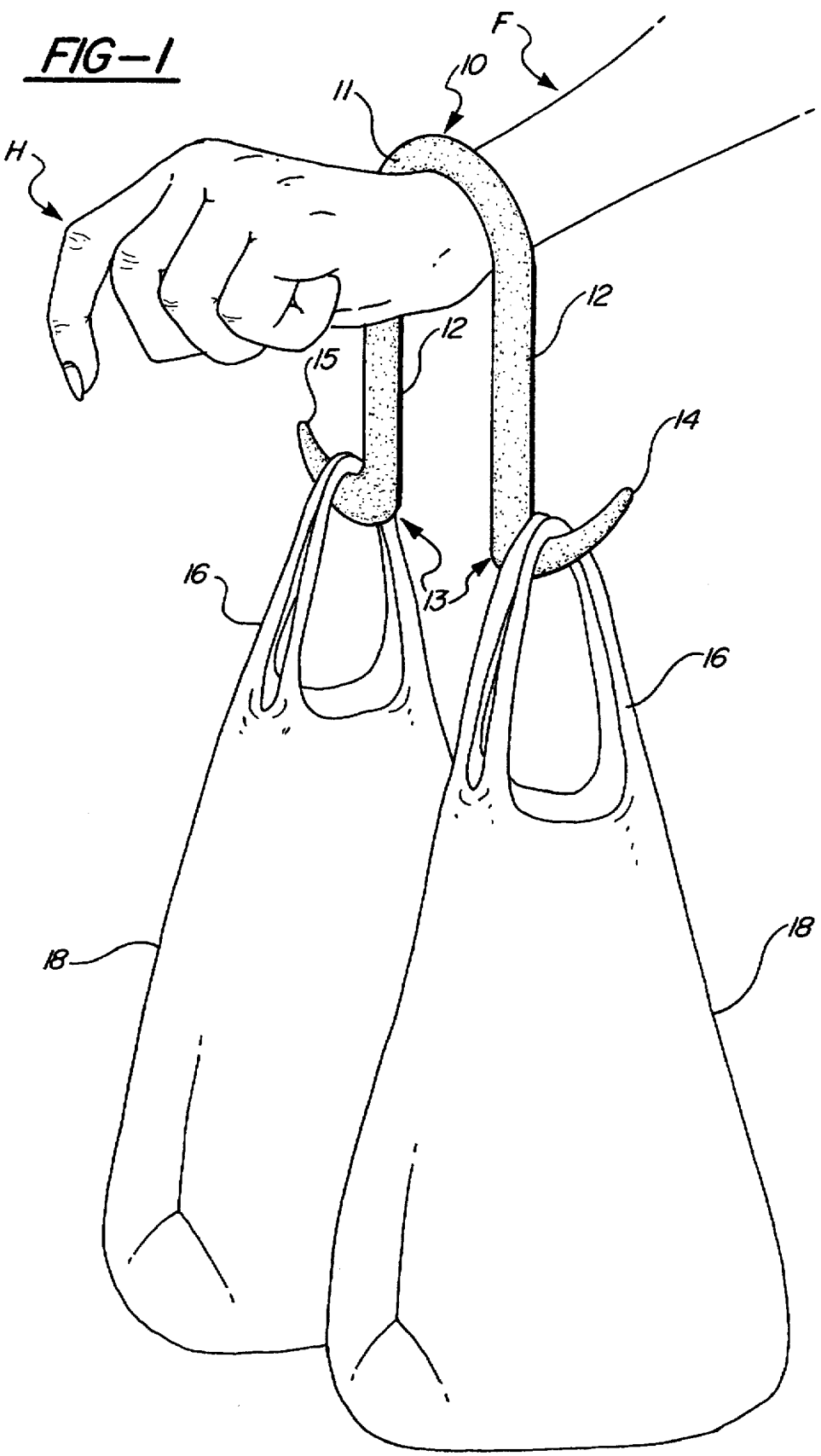

HANDS-FREE CARRIER FOR LOADED BAGS

RELATED APPLICATION

This patent application claims priority of U.S. provisional patent application Ser. No. 60/042,779, filed Apr. 7, 1997.

FIELD OF THE INVENTION

This invention concerns the field of hand-held carriers and, more particularly, to such a carrier adapted to be supported around the forearm of the user for carrying a plurality of loaded plastic shopping bags.

BACKGROUND OF THE INVENTION

Increasingly, supermarkets and other retail stores have adopted the practice of packing groceries in thin plastic shopping bags. These plastic bags have the advantage of including a handle which is graspable by the user. Thus, the bags can be grasped by the hand of the user, in contrast to brown paper bags which generally have to be carried under the arm.

While such plastic shopping bags have proved popular with grocery shoppers, they do have some disadvantages. When heavily loaded, the handle of the bag is particularly apt to cut into the hand of the user grasping it. Furthermore, since the handle is designed to be grasped by the user's hand, the hand is encumbered to the point where the user is unable to perform any other activities with the hand, such as retrieving car keys, unlocking a car, or opening a door. Additionally, it is cumbersome to grasp a plurality of such plastic shopping bags by their handles.

Bag carriers are known in the prior art. For example, see U.S. Pat. Nos.: 759,056; 5,026,105; 3,262,727; 5,150,938; 645,317; 3,251,622; and 2,153,212. While these patents show various types of carrier handles for carrying one or more bags or cartons, all of them suffer from the same disadvantage. They must be grasped by the user when in use. Accordingly, the hand is disabled from other uses.

Thus, it would be desirable to have a means of carrying a plurality of loaded plastic shopping bags that left the user's hands unencumbered, and did not have to be uncomfortably grasped by the user. It would be particularly advantageous to have a way to carry such bags that is easy, comfortable and convenient for the user.

SUMMARY OF THE INVENTION

The invention described herein has been designed to overcome the disadvantages of the prior art noted above. The invention is a hands-free carrier comprising an elongated, U-shaped body having a base and a pair of opposed legs contiguous therewith. Each of the opposed legs terminates in a free end. Each free end is fashioned into a hook, each of the hooks curving toward the base of the U. The U-shaped body is adapted to be supported around the forearm or wrist of the user, with the free ends extending downwardly below the user's forearms. Thus, when the carrier is in use, each of the hooks will curve upward.

Loaded bags may be secured on one or both of the free ends by passing one of the hooks through the opening in the handle of the bag. The user will generally maintain the burdened forearm in a horizontal attitude to support the bags more or less upright. This will leave the user's hand free for other activities while carrying the bags with the carrier handle of the present invention.

The carrier body may be formed of aluminum, steel, copper, or plastic tubing bent so as to have a U-shaped configuration to pass over the user's arm. Alternatively, it may be formed of molded plastic or formed metal.

BRIEF DESCRIPTION OF THE DRAWING

The following detailed description may best be understood by reference to the following drawing in which:

FIG. 1 illustrates an embodiment of the hands-free carrier of the present invention supported upon the wrist of a user and being employed to carry a pair of handled shopping bags.

DETAILED DESCRIPTION OF THE PREFERRED EMBODIMENT

FIG. 1 illustrates an embodiment of the hands-free carrier of the present invention. A U-shaped body 10, formed of a metal such as steel, copper or aluminum, or of molded plastic or plastic tubing, is shown supported by the forearm F of a user.

The U-shaped body 10 includes a base 11 and a pair of descending legs 12 contiguous therewith, each of which legs 12 terminates in a free end 13. A pair of upwardly curved hooks 14 and 15 are formed on each of the free ends 13.

As can clearly be seen in FIG. 1, the legs 12 of the body 10 are long enough such that the hooks 14, 15 extend well below the user's forearm F. This arrangement helps ensure that the hand H of the user will remain unencumbered by a pair of plastic bags 18 supported on the hooks 14, 15. As is illustrated, each bag 18 has a handle 16 which is passed over one of the hooks 12, 14 so that the bags hang below the hooks.

By using the carrier of the present invention, instead of grasping the bags 18 by their handles 16, the hand H of the user remains unencumbered.

While the bags 18 illustrated in FIG. 1 are typical plastic grocery bags, the carrier 10 of the present invention can equally advantageously be used with any kind of handled shopping bag, or, indeed, with any other kind of burden, such as a beverage carrier, which the user desires to carry without encumbering the hands.

The carrier of the present invention may easily be molded from a suitable moldable plastic, or formed from more durable metal, such as aluminum. It may also be formed of plastic or metal tubing. It is easy and inexpensive to manufacture, and has the advantage of being inexpensive enough to be offered as a premium by retail outlets such as grocery stores. A promotional message, such as the name of the store, could, for example, be printed on the carrier body.

A hands-free carrier useful for supporting a plurality of handled shopping bags has been described with reference to certain exemplifications and embodiments thereof. Of course, certain modifications of the present invention may occur to one of skill in the art without departing from the spirit of the present invention. It is the following claims and reasonable equivalents thereof, rather than the exact depicted embodiments and exemplifications, that define the true scope of the present invention.

I claim:

1. A hands-free carrier for loaded bags comprising:
   a U-shaped carrier body including an arcuate base and a pair of opposed legs contiguous therewith and terminating in free ends, the free ends spaced apart by a distance greater than a width of a human wrist; and
   a hook formed on each of the free ends, each of the hooks curving upwardly toward the base of the carrier body and having an upwardly facing opening, the hooks being directed outwardly away from each other, each hook being adapted to support the handle of a loaded shopping bag;

the carrier body and hooks residing in a common plane, the base of the body curving arcuately from one of the legs to the other within the common plane of the body and hooks;

wherein the base of the carrier body may be supported upon the forearm or wrist of the user, thus leaving the user's hand free for other activities; and each of the pair of opposed legs is of sufficient length such that, when the carrier is in use, each of the hooks is disposed substantially below the level of the user's forearm.

2. The carrier of claim 1 wherein the carrier body is formed of a material selected from the group consisting of: aluminum, steel, copper, molded plastic, plastic tubing, or metal tubing.

* * * * *